United States Patent [19]

Haumaier

[11] 4,005,577
[45] Feb. 1, 1977

[54] VEHICLE DRIVE UNIT UTILIZING HYDRAULIC PUMP AND MOTOR

[75] Inventor: Robert Haumaier, Mahopac, N.Y.

[73] Assignee: Haumaier Automotive Energy Saver, Inc., Bedford Hills, N.Y.

[22] Filed: Dec. 30, 1975

[21] Appl. No.: 645,441

[52] U.S. Cl. .................................. 60/431; 60/468; 60/487

[51] Int. Cl.² ...................................... F16H 39/46

[58] Field of Search ............ 60/327, 445, 449, 431, 60/433, 434, 468, 476, 487, 494; 180/66 R; 74/687

[56] References Cited

UNITED STATES PATENTS

| | | | |
|---|---|---|---|
| 2,232,428 | 2/1941 | Benedek | 60/494 X |
| 2,976,685 | 3/1961 | Thoma et al. | 60/431 |
| 3,135,087 | 6/1964 | Ebert | 60/468 X |
| 3,180,080 | 4/1965 | Budzich et al. | 60/451 |
| 3,451,218 | 6/1969 | Grant | 60/494 X |

Primary Examiner—Edgar W. Geoghegan
Attorney, Agent, or Firm—Cooper, Dunham, Clark, Griffin & Moran

[57] ABSTRACT

A vehicle drive system utilizing an engine controlled to operate at a substantially constant speed during vehicle operation. Means are provided to vary that engine speed in accordance with different types of operation. The engine powers an hydraulic pump, the output flow from which is varied to determine the vehicle speed. An hydraulic motor receiving fluid from the pump is driven thereby and is coupled to the drive shaft of the vehicle.

3 Claims, 1 Drawing Figure

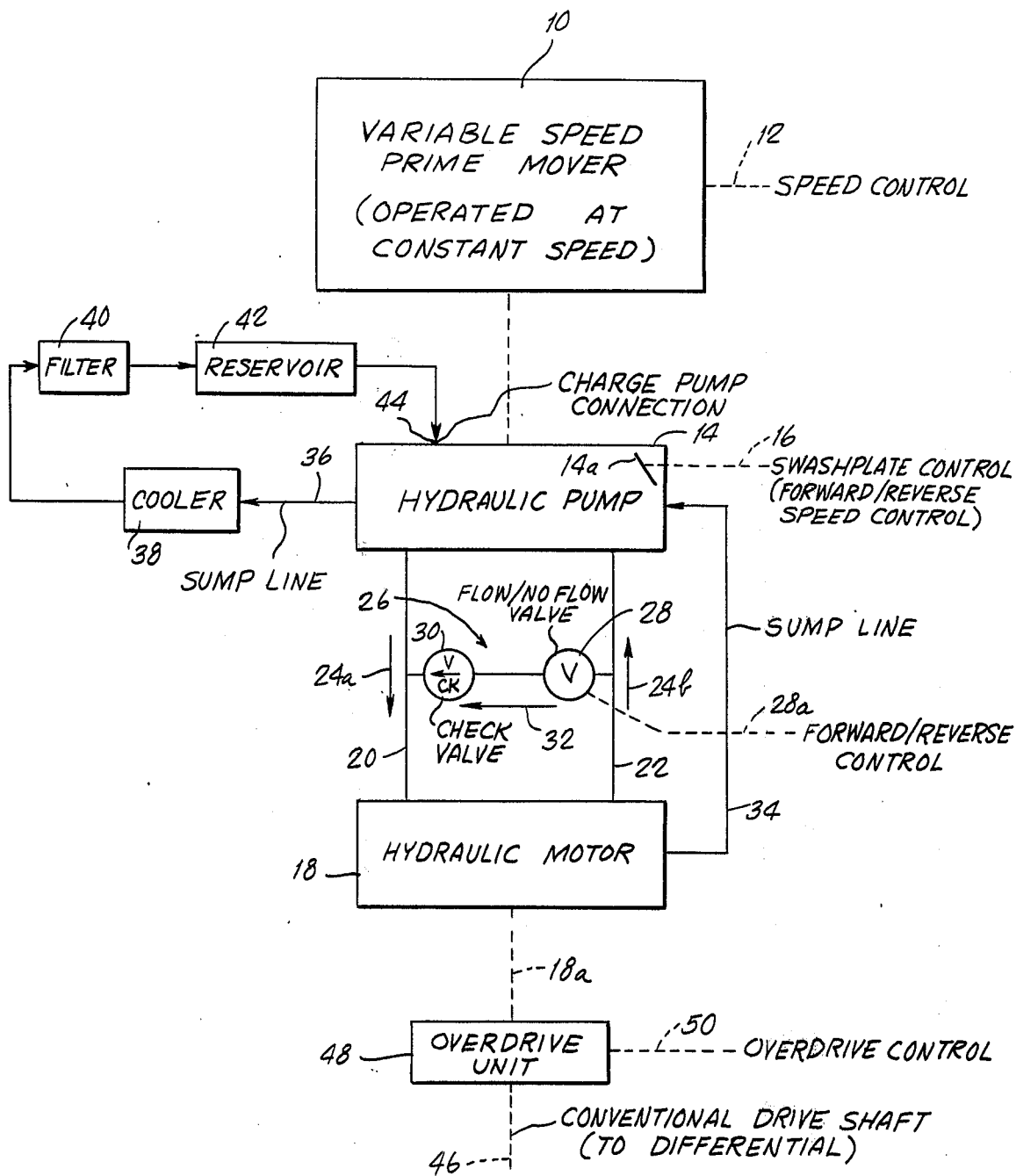

VEHICLE DRIVE UNIT UTILIZING HYDRAULIC PUMP AND MOTOR

BACKGROUND AND BRIEF DESCRIPTION OF THE INVENTION

This invention relates to drive mechanisms for powering the drive wheels of vehicles. More particularly, it provides a unique drive mechanism for powering a vehicle, utilizing a prime mover driven at a substantially constant speed at which efficiency of performance is optimized.

With the energy crisis confronting the world, it is imperative to produce vehicles which are as efficient and consume as little fuel and emit as few combustion by-products as possible. The traditional internal combustion engine as heretofore used in drive mechanisms for vehicles is notoriously inefficient, particularly because it is typically operated over a wide range of speeds within which the efficiency of performance varies considerably. The present invention utilizes a prime mover which is driven at a substantially constant speed, so that the efficiency of power development may be optimized and emissions minimized. Provision is made to vary the operating speed of the primer mover depending upon the range of desired vehicle speeds. For example, the prime mover may be operated at a first, relatively low speed for city driving of an automobile, e.g., for speeds less than about 30 to 40 miles per hour. The prime mover may be operated at another, higher speed, for vehicle operation in the country, e.g., speeds in excess of 40 miles per hour. For any given operation, the prime mover speed is maintained constant to optimize the efficiency of power development and to minimize emissions.

The prime mover drives an hydraulic pump which in turn drives an hydraulic motor. The output flow of the pump is controlled to determine vehicle speed and direction. A bypass fluid circuit is utilized to permit free wheeling of the vehicle in the forward direction of movement, in particular. It is believed preferable to provide no free wheeling capability in the reverse direction of vehicle movement. In this fashion, the drive system of the vehicle may be used as an emergency braking means, so that if the brake system of the vehicle fails, the drive system may be placed in the "reverse" mode to prevent free wheeling and to provide natural braking of the vehicle.

While constant speed prime movers have been used in the past, and while hydraulic pump and motor combinations have also been utilized, it is not believed that a drive system for an automobile, utilizing a constant speed prime mover driving an hydraulic pump which in turn drives an hydraulic motor has been utilized in the past to provide vehicle movement over the whole range of permissible vehicle speeds, e.g., zero to 80 and more miles per hour.

The following patents and publication are representative of the prior art:

| U.S. Patent No. | Date | Patentee |
|---|---|---|
| 2,431,719 | Dec. 2, 1947 | G. W. Wilkin |
| 3,352,373 | Nov. 14, 1967 | R. M. Tuck |
| 3,509,721 | May 5, 1970 | J. M. Crawford |
| 3,587,765 | June 28, 1971 | J. W. McFarland |
| 3,612,202 | Oct. 12, 1971 | H. C. Moon, Jr. et al |
| 3,637,036 | Jan. 25, 1972 | G. W. Swisher, Jr. et al |
| 3,817,341 | June 18, 1974 | C. K. Greene |
| 3,892,283 | July 1, 1975 | J. W. Johnson |

Publication: Engineering Application Manual, Bulletin 9565, Rev. E., January, 1975. Published by Sundstrand Hydro-Transmission, Ames, Iowa, a unit of Sundstrand Corporation

BRIEF DESCRIPTION OF THE DRAWING

The drawing illustrates a presently preferred embodiment of the invention in block diagram form.

DETAILED DESCRIPTION

Referring to the drawing, a drive mechanism for powering a vehicle such as an automobile is shown. The mechanism is self-contained in the vehicle, and utilizes a prime mover 10 such as an internal combustion engine, e,g,. a gasoline or diesel engine. The prime mover 10 is designated as being of variable speed, and is under the control of a conventional speed control mechanism 12. For any particular operation, the prime mover 10 is operated at a substantially constant speed. That speed may vary according to the operation of the vehicle. Thus, for city driving, for example, the speed of the prime mover will be regulated to be a relatively low speed, while for country driving the prime mover speed will be substantially constant at a relatively higher speed. The prime mover 10 drives an hydraulic pump 14 which preferably is of the variable displacement type which includes a swashplate 14a to determine output fluid flow from the pump. The swashplate 14a may be controlled in turn by a swashplate control 16 to govern the amount and direction of fluid flow from the pump. The pump 14 is coupled to an hydraulic motor 18 by fluid conduits 20 and 22. Arrows 24a and 24b designate the direction of fluid flow between the pump and motor in the conduits 20 and 22 for the forward direction of vehicle movement. A bypass fluid circuit 26 is included between the fluid conduits 20 and 22 comprising a flow/no-flow valve 28 and a check valve 30. The check valve passes fluid in the bypass circuit only in the direction of arrow 32, i.e., in the direction from (a) the fluid conduit 22 that returns fluid from the motor to the pump in the forward movement of the vehicle to (b) the fluid conduit 20. The bypass circuit 26 is provided for free wheeling of the vehicle, reverse movement of the vehicle, as well as braking of the vehicle in the event of brake system failure, and will be described in more detail below.

A sump line 34 interconnects the motor 18 and pump 14. An additional sump line 36 extends from the pump 14 to a cooler 38 which cools the hydraulic fluid within the hydraulic system. The cooler passes the fluid to a filter 40 which filters dirt therefrom. Fluid from the filter 40 passes to a reservoir 42 and thence to the charge pump connection 44 of the hydraulic pump 14.

The hydraulic motor 18 drives a conventional drive shaft 46 through an intermediate overdrive unit 48, if desired. The overdrive unit is under the control of a conventional overdrive control 50.

The operation of the system is as follows. Assume that an automobile utilizing a drive system as shown in the drawing is to be operated, for example, at city driving speed of less than say 30 miles per hour. The prime mover is adjusted in speed by suitable adjustment of the speed control 12 so that maximum flow of fluid from the hydraulic pump 14 produces a corresponding hydraulic motor speed from the motor 18 to produce a 30 mile per hour vehicle speed. The prime mover is regulated so that its speed stays substantially constant and does not vary, regardless of whether the vehicle is at rest or moving anywhere within the speed range 0 to 30 miles per hour, for example. At vehicle rest, the swashplate 14a of the hydraulic pump is in the neutral position. There is no flow of fluid through the conduits 20 and 22 and, accordingly, there is no movement of hydraulic motor output shaft 18a. As it is desired to move the vehicle in the forward direction, the swashplate 14a is moved from the neutral position to a position corresponding to forward movement. This movement of the swashplate is under control of the swashplate control 16 which may, for example, constitute a conventional accelerator pedal in an automobile. Movement of the swashplate 14a from its neutral position results in a flow of fluid as shown by arrows 24a and 24b within the fluid conduits 20 and 22. The fluid passes through the hydraulic motor 18 driving its output shaft 18a and causing a corresponding movement of the conventional drive shaft 46 of the vehicle itself. The speed of the vehicle in the forward direction is controlled exclusively by the position of the swashplate 14a of the hydraulic pump, as governed by the swashplate control 16.

The bypass fluid circuit 26 operates to provide free wheeling of the vehicle in the following fashion. The flow/no-flow valve 28 is in the flow position permitting fluid to flow through the circuit 26 in the direction of the arrow 32. As long as the hydraulic pump 14 is driving the hydraulic motor 18 there is no flow of fluid through the bypass circuit; rather, the flow of fluid is from the hydraulic motor 18 and through the fluid conduit 22 into the hydraulic pump 14. Whenever the swashplate 14a is "released" to lower the vehicle speed, however, the pump 14 acts to lower the flow of fluid therethrough. In the neutral position of the swashplate 14a, no fluid can flow through the hydraulic pump. The hydraulic motor, on the other hand, being coupled to the drive shaft of the vehicle, continues to turn and to act as a pump itself. The flow of fluid from the motor 18, since it can not all be accommodated in the pump 14, circulates through the bypass fluid circuit 26 and thus bypasses the pump 14 without passing through the pump. In this fashion the bypass fluid circuit 26 accommodates the difference in fluid flows between the hydraulic motor 18 and hydraulic pump 14. Such action permits free wheeling of the vehicle. Without such a bypass circuit, the vehicle would be automatically braked by the action of the hydraulic pump 14 in restricting the flow of fluid therethrough.

The feature of utilizing the drive system for braking purposes is possible through a bypass fluid circuit such as is shown in the drawing. In particular, if the flow/no-flow valve 28 is moved to the "no-flow" position while the vehicle is moving in the forward direction, the bypass fluid circuit is essentially removed from operation. Thus all fluid passing through the hydraulic motor 18 must pass through the hydraulic pump 14. In the event that the swashplate 14a is moved to the neutral position, for example, producing a theoretical condition of no-flow of fluid through the hydraulic pump, an automatic braking of the vehicle is provided. Such operation is useful in the event that the brake system of the vehicle fails.

When it is desired to reverse the direction of vehicle movement, the swashplate 14 under the control of the swashplate control 16 is moved from the neutral position to a position reverse from the forward position. In this case the flow of fluid within the conduits 20 and 22 is opposite from that as shown by the arrows 24a and 24b. In order to achieve reverse vehicle movement, the flow/no-flow valve valve 28 is moved to the "no-flow" position. Otherwise, the hydraulic motor 18 would be completely bypassed by the bypass fluid circuit 26 which would permit fluid to flow from the hydraulic pump 14 in the direction of arrow 32 through that bypass circuit. Thus the valve 28 prevents any flow of fluid within the bypass circuit permitting the hydraulic motor 18 to be driven in the reverse direction. It will be appreciated that since there is no bypass fluid circuit in operation during reverse direction vehicle movement, there is no free wheeling capability as is possible in the forward direction of vehicle movement. It would be possible to provide for free wheeling in the reverse direction by including an additional bypass fluid circuit similar to the circuit 26, with a check valve operating to pass fluid in a direction opposite from that as shown by the arrow 32. The two bypass fluid circuits would be operated, of course, with only one in operation at any one time. This achieved be appreciated by appropriate coupling between the flow/no-flow valves of the two circuits, so that when one valve is open, the other is automatically closed. It is believed preferable, however, to limit the system to one bypass fluid circuit as shown in the drawing to provide for vehicle braking from the drive system itself, as described above, in the event of brake system failure.

Thus control of vehicle movement is achieved by way of both the swashplate control 16 and the forward-/reverse control 28a. As noted, the swashplate control 16 may constitute the conventional accelerator pedal in an automobile. Since the swashplate 14a is conventionally spring biased to the neutral position, a toe and heel operated accelerator pedal to provide for forward and reverse movement of the swashplate may be conveniently utilized. The forward/reverse control 28a may be coupled to the swashplate control 16, if desired, or a separate control lever may be provided, as desired. The speed control mechanism 12 is conventional, and is used to select the speed of the prime mover 10 commensurate with the desired vehicle speed. As it is desired to increase the maximum speed of the speed range of the vehicle, the speed control 12 of the prime mover is appropriately adjusted. However, during an operation of the vehicle, the prime mover speed is retained substantially constant, as noted above.

A system such as shown in the drawing has been installed in a 1966 Ford Mustang automobile. The primer mover 10 was constituted by a four cylinder Wisconsin gasoline engine model VH The cam shaft was modified to provide maximum torque at about 1800 rpm, as against approximately 2200 rpm which is typical for that engine. The carburetion was also modified to provide for an initial updraft (rather than downdraft) to reduce emissions. Additionally, air injection was employed on both intake and exhaust manifolds to reduce emissions. The hydraulic pump 14 was constituted by a Sundstrand variable displacement pump, model 21-2023 as manufactured by the Sundstrand Corporation. The hydraulic motor 18 was also a Sundstrand motor model 21, in this case a fixed displacement motor. An overdrive unit was utilized, Hone model 3000, No. 4372, Hone-O-Drive made in Sante Fe Springs, Calif. The flow/no-flow valve 28 was a Petro ball valve assembly. The check valve 30 was a Teledyne Republic high pressure check valve.

With the particular Wisconsin internal combustion engine employed, the engine is variable between about 1400 and 2800 rpm. This produces a corresponding rpm output from the hydraulic motor 18 for the units mentioned above which is the same. An 1800 rpm drive shaft output corresponds to a vehicle speed of about 73 miles per hour. Accordingly, 2800 rpm drive shaft output corresponds to a vehicle speed of about 114 miles per hour. The overdrive unit 48, of course, increases the drive shaft output speed over that which would be obtainable without the unit. The Wisconsin engine described above is most efficient in the range 1400 to 2000 rpm, corresponding to a maximum speed of about 82 miles per hour (without use of the overdrive unit). For city driving, the internal combustion engine will be operated at about 1400 rpm. For country driving, the engine will be operated up to about 2000 rpm for the most efficiency. The speed of the engine is only changed as the vehicle speed range varies, between, for example, city driving and country driving.

While the hydraulic motor 18 is presently preferred as a fixed displacement hydraulic motor, it is possible to utilize a variable displacement hydraulic motor. With such a variable displacement hydraulic motor, different relationships between hydraulic pump input driving speed and hydraulic motor output shaft are possible. Control of the swashplate in a variable displacement hydraulic motor would have to be provided for, and in the system as shown in the drawing of the present application the use of a fixed displacement hydraulic motor simplifies greatly the controls that must be utilized.

It is possible to utilize a conventional automobile engine, for example, of greater power than the Wisconsin engine noted above. Typically, the cam shaft of such an engine would be specially ground so as to change the rpm range of maximum efficiency to be between about 1400 and 1800 rpm. The compression ratio would normally be lowered to cause less emission pollutants. The carburetion would be changed to be "free flow", i.e., an updraft carburetion with no accelerating pump mechanism and the like. The ignition timing would be reset to reduce pollutants. With such modifications a conventional automobile with a large size engine achieving, for example, 15 miles per gallon, with the conversion noted above to an hydraulic drive system may achieve about 45 miles per gallon. With the Wisconsin engine and the hydraulic drive system described above, it is believed that 100 to 105 miles per gallon are achievable in a 3000 pound vehicle. The system described above, using a conventional exhaust system, is believed to reduce the emission level to about 0.4% carbon monoxide, with 25 parts per million hydrocarbons.

It will be appreciated that the present invention is capable of achieving significant fuel usage efficiencies and greatly reduced emissions.

The preferred embodiment described above is susceptible of modification. Accordingly, the invention should be taken to be defined by the following claims.

What is claimed is:

1. An hydraulic drive system to power a drive shaft of a vehicle to be driven over a wide range of speeds, comprising an engine controlled to operate at a substantially constant speed during vehicle operation, engine speed control means for varying that speed of operation of said engine dependent upon a desired sub-range of operation within said wide range, an hydraulic pump powered by the engine and providing a maximum fluid output flow depending upon said engine speed and including pump flow control means for varying the flow of fluid output from the pump, an hydraulic motor receiving fluid output from the pump and driven thereby, and means coupling the hydraulic motor to the drive shaft of the vehicle to power that drive shaft which is driven over said sub-range of operation corresponding to the speed at which said engine operates.

2. An hydraulic drive system according to claim 1, including a bypass fluid circuit coupled to said motor to permit circulation of fluid between said motor and bypass circuit without passing through said pump, check valve means in said bypass fluid circuit permitting fluid to pass therethrough in one direction only, and flow/no-flow valve means in said bypass circuit to control the flow of fluid therethrough and selectively positioned according to the direction of vehicle movement.

3. An hydraulic drive system to power a drive shaft of a vehicle comprising an engine controlled to operate at a substantially constant speed during vehicle operation, engine speed control means for varying that speed of operation of said engine, an hydraulic pump powered by the engine and including pump flow control means for varying the flow of fluid output from the pump, an hydraulic motor receiving fluid output from the pump and driven thereby, and means coupling the hydraulic motor to the drive shaft of the vehicle to power that drive shaft, in which said pump flow control means varies the volume and direction of fluid flow from said pump, and including forward/reverse and speed control means coupled to said pump flow control means for determining the direction and amount of output fluid flow from said hydraulic pump, said pump and motor including first and second fluid conduits therebetween, a bypass fluid circuit interconnecting said first and second fluid conduits, a check valve in said bypass fluid circuit passing fluid only from (a) that one of said first and second fluid conduits that returns fluid from the motor to the pump in the forward movement of the vehicle to (b) the other one of said first and second fluid conduits, flow/no-flow valve means in said bypass circuit under the control of the operator of the vehicle to control fluid flow in said bypass circuit, said flow/no-flow valve means being positioned in the no-flow position when it is desired to move the vehicle in the reverse direction.

* * * * *